United States Patent [19]

Piejko et al.

[11] Patent Number: 4,879,367
[45] Date of Patent: Nov. 7, 1989

[54] PROCESS FOR THE PREPARATION OF ALIPHATIC POLYCARBONATES WITH ALKOXY SILANE INITIATOR

[75] Inventors: Karl-Erwin Piejko, Cologne; Bruno Bömer, Bergisch Gladbach; Hans-Josef Buysch, Krefeld; Michael Hüllmann, Heppenheim, all of Fed. Rep. of Germany

[73] Assignee: Bayer Aktiengesellschaft, Leverkusen, Fed. Rep. of Germany

[21] Appl. No.: 212,817

[22] Filed: Jun. 29, 1988

[30] Foreign Application Priority Data

Jul. 14, 1987 [DE] Fed. Rep. of Germany ....... 3723194

[51] Int. Cl.$^4$ .............................................. C08G 63/62
[52] U.S. Cl. ..................................... 528/371; 528/370
[58] Field of Search ................................ 528/371, 370

[56] References Cited

U.S. PATENT DOCUMENTS 3,026,298 3/1962 Lee et al. ............................. 528/371

FOREIGN PATENT DOCUMENTS 0121396 9/1975 Japan .

Primary Examiner—Harold D. Anderson
Attorney, Agent, or Firm—Sprung Horn Kramer & Woods

[57] ABSTRACT

Process for the preparation of aliphatic polycarbonates by polymerizing cyclic aliphatic carbonates in the presence of initiators and/or catalysts, in which the initiators used are alkoxy silanes of the formula

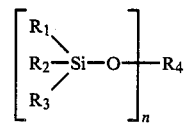

in which $R_1$, $R_2$ and $R_3$ independently of one another represent a $C_1$–$C_4$-alkyl radical, n is an interger from 1 to 6 and $R_4$ denotes an n-valent, optionally substituted, aliphatic hydrocarbon radical, and the catalysts used are the nucleophilic catalysts which are known from group transfer polymerization.

10 Claims, No Drawings

PROCESS FOR THE PREPARATION OF ALIPHATIC POLYCARBONATES WITH ALKOXY SILANE INITIATOR

The invention relates to a new process for the preparation of aliphatic polycarbonates by polymerizing cyclic carbonates.

Processes for the preparation of aliphatic polycarbonates by polymerizing cyclic carbonates are known (see J. Am. Chem. Soc. 52, pages 314 et seq. (1930); German Offenlegungsschriften 1,545,116, 1,545,117, 1,545, 118, 3,103,135 and 3,204,078; EP-A 188,204; and Makromol. Chem. 187, pages 2579 et seq. (1986)). The processes mentioned in the publications mentioned above differ essentially in the catalyst and/or initiators with an alkaline reaction which are used in them and which are utilized for the ring-opening polymerization of the cyclic carbonates.

In accordance with the process described in J. Am. Chem. Soc. 52, pages 314 et seq. (1930) the polymerization is initiated by means of potassium carbonate as a catalyst with an alkaline reaction; the polymerization is carried out at 130° C. in the absence of solvents. In the processes described in German Offenlegungsschriften 1,545,116, 1,545,117 and 1,545,118 organometallic compounds, such as metal alcoholates and amides, are used as the polymerization catalysts; the polymerization is carried out at 90° C. in the absence of solvents. In accordance with the processes described in German Offenlegungsschriften 3,103,135 and 3,204,078 thallium compounds with an alkaline reaction are employed as the polymerization catalysts. A process for the preparation of crosslinked duromers from cyclic carbonates is described in EP-A 188,204; the catalysts employed in this process are composed of two components, namely a) amides, amines, ureas, lactones or (thio)alcohols and b) alkali metal alcoholates or carbonates, alkaline earth metal oxides, organoalkali metal or organoaluminium compounds. The polymerization is carried out in the absence of solvents at an elevated temperature. The polymerization of cyclic carbonates in the presence of solvents is described in Makromol. Chem. 187, pages 2579 et seq. (1986); the reaction is carried out at low temperatures (below the ceiling temperature of $-30°$ C.), and sec.-butyllithium is used as the initiator. (Ceiling temperature is the temperature above which no further polymerization takes place to give high-molecular polymers.

All the processes mentioned above have the disadvantage, owing to the catalysts and/or initiators with an alkaline reaction which are used in them, that no aliphatic polycarbonates containing alkali-sensitive groups which can be polymerized by free radicals, such as the (meth)acryloyl group, can be prepared by means of them. Polycarbonates containing alkali-sensitive groups of this type which can be polymerized by free radicals are, however, of considerable industrial interest as prepolymers. These prepolymers can be converted, for example after shaping, into duromers by free-radical polymerization, or can be reacted with other monomers to give copolymers having a comb-like structure. Aliphatic polycarbonates having completely new patterns of properties are accessible in this way from the aliphatic polycarbonates containing alkali-sensitive groups which can be polymerized by free radicals.

Owing to their low reactivity, the ammonium phosphonates described in DE-OS (German Published Specification) 3,523,399 as catalysts for the ring-opening polymerization of cyclic carbonates can only be used for polymerization reactions above 130° C.; in addition they are unsuitable for the introduction of functional groups into the polymer.

An initiator/catalyst combination for the ring opening polymerization of cyclic aliphatic carbonates which no longer displays the disadvantages of the known catalysts has now been found. It has been found that the polymerization of cyclic aliphatic carbonates to give aliphatic polycarbonates can be initiated effectively by means of certain alkoxy silanes (trisalkylsilyl ethers) in combination with the nucleophilic catalysts which are known from group transfer polymerization. The polymerization reactions initiated by means of this combination of certain alkoxy silanes and nucleophilic catalysts take place rapidly and completely either at high temperatures or at low temperatures and in either the presence or the absence of solvents and, at the same time, result in polymers having a uniform chain length, that is to say a uniform distribution of the number average molecular weight. Furthermore, it is possible to introduce alkali-sensitive functional groups into the polymer by means of this special initiator/catalyst combination.

The invention therefore relates to a process for the preparation of aliphatic polycarbonates by polymerizing cyclic aliphatic carbonates in the presence of initiators and/or catalysts, which is characterized in that the initiators used are alkoxy silanes of the formula

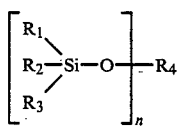

I in which
$R_1$, $R_2$ and $R_3$ independently of one another represent a $C_1$–$C_4$-alkyl radical, n is an integer from 1 to 6 and
$R_4$ denotes an n-valent, optionally substituted, aliphatic hydrocarbon radical,
and the catalysts used are the nucleophilic catalysts which are known from group transfer polymerization.

The polymerization-initiating action of the combinations, to be used in accordance with the invention, of alkoxy silanes of the formula I and nucleophilic catalysts could not in any way have been foreseen. On the contrary, it was known from U.S. Patent Specifications 4,414,372 and 4,417,034 that the trisalkylsilyl ethers which can, if appropriate, be used as initiators in the polymerization of acrylic acid derivatives must be derived from enols, for example must be 0-silyl ketene acetals, and that trisalkylsily ethers which do not have an enolate structure are stable under the polymerization conditions, that is to say are ineffective as an initiator. It has been found, surprisingly, that, in the polymerization of the cyclic aliphatic carbonates, trisalkylsilyl ethers which do not have an enolate structure, namely the trisalkyl ethers of the formula I, are highly effective initiators, although the polymerization of the carbonates is carried out under conditions which are comparable to those used for the polymerization of acrylic acid derivatives.

The initiator/catalyst combination to be used in accordance with the invention has the advantage that the initiators to be used in it are readily accessible, stable, distillable and non-hazardous, that is to say can be handled without special precautionary measures. The combination according to the invention also has the advantage that the polymerization can also be carried out in solution and thus makes possible polymerization below the ceiling temperature of the polycarbonates formed. Linear aliphatic polycarbonates in which the molecular weights are determined by the monomer/initiator ratio and which have defined end groups can be obtained in this manner.

$C_1$–$C_4$-alkyl radicals suitable for $R_1$, $R_2$ and $R_3$ are, above all, the methyl, ethyl, n-propyl, isopropyl and n-butyl, isobutyl and sec.-butyl radicals.

$R_4$ represents the n-valent radical of an aliphatic hydrocarbon; the alkoxy silanes of the formula (I) which are to be used in accordance with the invention as initiators can be derived from both monohydric and polyhydric alcohols. $R_4$ therefore represents aliphatic hydrocarbon radicals which form the skeleton of monohydric and polyhydric alcohols.

Substituents suitable for the n-valent hydrocarbon radicals represented by $R_4$ are, above all, alkoxy and/or acyloxy or acylamino groups; preferred substituents are $C_1$–$C_{20}$-alkoxy, $C_1$–$C_{20}$-alkenoxy, (meth)acryloyloxy or (meth)acryloylamino groups.

The following n-valent aliphatic hydrocarbon radicals may be mentioned as examples of $R_4$:

As monovalent radicals: saturated or unsaturated, aliphatic $C_1$–$C_{20}$ hyrocarbon radicals, such as the methyl, ethyl, isopropyl, n-butyl, sec.-butyl, 2-ethylhexyl, n-dodecyl, palmityl, stearyl, allyl and oleyl radicals; furthermore polyoxaalkylene radicals of the formula

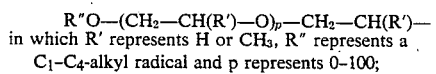

in which R' represents H or $CH_3$, R" represents a $C_1$–$C_4$-alkyl radical and p represents 0–100;

as divalent radicals: $C_2$–$C_{20}$-alkylene radicals, such as the ethylene, 1,2-propylene, 1,3-propylene, 1,4butylene, 1,2-butylene, hexamethylene and 1,2-hexylene radicals; as trivalent radicals: above all those hydrocarbon radicals which are derived from aliphatic triols such as glycerine, trimethylolethane, trimethylolpropane or hexanetriole; as tetravalent radicals: above all those hydrocarbon radicals which are derived from aliphatic tetravalent alcohols such as pentaerythrite, as pentavalent radicals: above all those hydrocarbon radicals which are derived from aliphatic pentavalent alcohols such as xylite; and as hexavalent radicals: those hydrocarbon radicals which are derived from hexavalent aliphatic alcohols such as sorbite.

The following radicals may be mentioned as examples of the substituted radicals $R_4$: the 2-(meth)acryloyloxyethyl radical, the 3-(meth)acryloyloxypropyl radical and the 2-(meth)acryloylaminoethyl radical and also the 2-methoxyethyl, 2-hexyloxyethyl, 3-ethoxypropyl, 3-allyloxyethyl, 3-methoxy-1,2-propylene and the 2,2-bis- ethoxy-1,3-propylene radicals.

The initiators of the formula I which are to be used in accordance with the invention are generally employed in an amount of 0.001–20% by weight, preferably 0.01–15% by weight and particularly preferably 0.05–10% by weight, relative to the weight of the monomers.

The following fluorides and hydrogenfluorides may be mentioned preferably as examples of nucleophilic catalysts which are known from group transfer polymerization: tris-(dimethylamino)-sulphonium difluorotrimethylsilicate (TASF), tetrabutylammonium fluoride (TBAF), tris-(dimethylamino)-sulphonium hydrogenfluoride (TASHF$_2$), tetraalkylammonium hydrogenfluorides, potassium hydrogenfluoride and benzyltrimethylammonium fluoride and hydrogenfluoride.

The preparation of the catalyst TASF, which is preferably used, is described in U.S. Patent Specification 3,940,402, and that of the corresponding hydrogenfluoride (TASHF$_2$) is described in "Polymer Preprints ACS Washington, 24, 52 (1983)".

The initiator and the catalyst are used in molar ratios between 500:1 and 0.1:1, preferably between 100:1 and 1:1 and particularly preferably between 10:1 and 1:1.

The cyclic aliphatic carbonates which can be employed in the polymerization process according to the invention can be monocyclic, dicyclic and polycyclic.

The following may be mentioned as monocyclic carbonates:

Carbonates of the general formula

in which $R^5$ denotes $(CH_2)n$ in which n=3 to 6, —$CH_2CH=CHCH_2$—, —$CH_2CH_2CH(CH_3)$—, —$CH_2CH_2OCH_2CH_2$—$OCH_2CH_2$—,

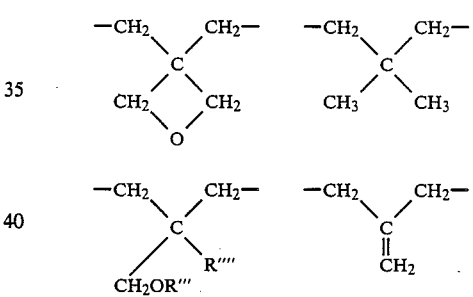

$R'''$=H, $C_1$–$C_4$-alkyl, allyl
$R''''$=$C_1$–$C_4$-alkyl carbonates of the general formula

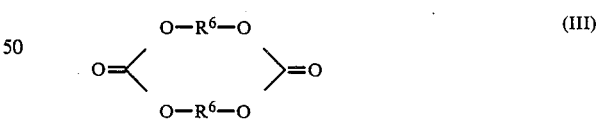

in which $R^6$ denotes $(CH_2)_n$ in which n=4 to 12, —$CH_2CH_2$—$OCH_2CH_2$—, —$CH_2CH_2$—O—$CH_2CH_2$—O—$CH_2CH_2$— or and the carbonate of the general formula

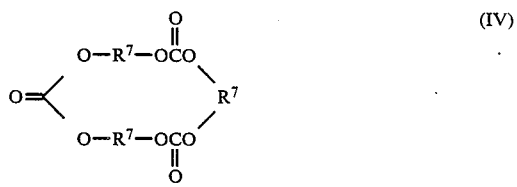

in which $R^7$ denotes —$CH_2CH_2OCH_2CH_2$—.

The monocyclic carbonates of the formula (II) are preferred.

The following may be mentioned as examples of bifunctional, bicyclic and polycyclic carbonates which have a crosslinking action:

Carbonates of the formulae

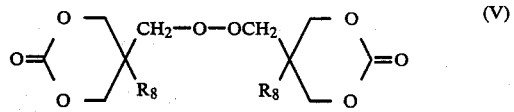 (V)

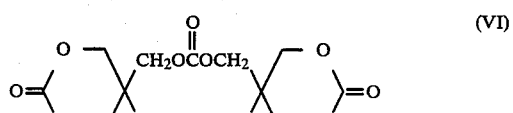 (VI)

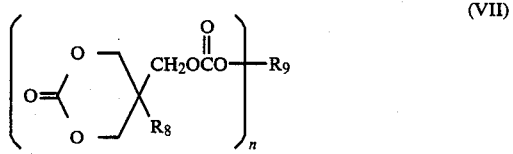 (VII)

in which
$R_8$ is a $C_1$-$C_4$-alkyl radical,
$R_9$ represents an alkylidene radical having 3 to 18 C atoms, an aryl radical having 6 to 12 C atoms or an aralkyl radical having 7 to 24 C atoms, and
n denotes 2, 3 or 4.

It is preferable to use bifunctional carbonates of the formula (VI).

The polymerization process according to the invention is carried out in an inert gas atmosphere, for example under argon or—preferably—under nitrogen, with the exclusion of atmospheric moisture.

The process according to the invention can be carried out both in the absence of solvents and in the presence of solvents. The solvents preferably employed are polar, aprotic solvents, such as ethers, for example tetrahydrofuran or dimethoxyethane, or nitriles, such as acetonitrile.

If solvents are used, the amount thereof depends on the solubility of the cyclic carbonates at the reaction temperature concerned. In general, the amounts of monomer in the solution are between 0.5% by weight and the saturation concentration in the solvent concerned, preferably between 1% by weight and the saturation concentration.

The polymerization according to the invention is carried out in the absence of solvents at temperatures from 70° to 170° C., preferably 80° to 160° C. This solvent-free procedure is suitable both for the preparation of homopolymers of specific cyclic aliphatic carbonate and for the preparation of copolymers from mixtures of different monofunctional cyclic carbonates and for the preparation Of copolymers consisting of one or more monofunctional and one or more polyfunctional cyclic carbonates having a crosslinking function. The amount of the latter in the crosslinked copolymers is preferably 5 to 20% by weight, relative to the total weight of the monomers.

The polymerization in solvents is carried out at temperatures from −100° to +20° C., preferably from −50° to +10° C. This procedure is suitable, above all, for the preparation of homopolymers or copolymers from monofunctional, cyclic aliphatic carbonates.

The polymerization process according to the invention is preferably carried out in the following manner:

The monomer or mixture of monomers, if appropriate dissolved in an organic solvent, is thermostatically controlled to a specific temperature and the solution of the catalyst and of the initiator is then added at the temperature specified. Once the polymerization reaction is complete, the polymerization mixture is deactivated by adding a deactivator, in order to prevent a reverse reaction leading to cyclic oligomers. The aliphatic polycarbonates obtained in the course of the polymerization reaction are then isolated, either by precipitation, for example by the addition of alcohols, or by removing the readily volatile compounds by distillation under mild conditions.

Deactivators which can be used are proton acids, such as water, hydrogen chloride or alkyl halides, such as methyl chloride, or carboxylic acid chlorides, anhydrides or esters. Preferred deactivators are methanolic hydrochloric acid, methyl iodide, benzyl chloride or chloroformic esters.

EXAMPLE 1

3 g of 5,5-dimethyl-1,3-dioxan-2-one (neopentyl glycol carbonate) are dissolved in 30 ml of tetrahydrofuran under nitrogen in a 100 ml flask which has been dried by heating in vacuo and is equipped with a magnetic stirrer. The solution is thermostatically controlled at −10° C., and 0.2 ml (0.2 mmol) of a 1-molar solution of tris-(dimethylamino)-sulphonium hydrogenfluoride ($TASHF_2$) in acetonitrile is then added. The polymerization is initiated by adding 0.15 g (1 mmol) of isobutyl trimethylsilyl ether. The polymerization mixture is stirred for 1 hour at −10° C. and 1 ml of an 8:2 methanol/hydrochloric acid mixture is then added. The polymerization mixture is freed from volatile constituents on a rotary evaporator.

3 g of polymer are obtained. The number average molecular weight ($M_n$) is 2.9 kg/mol (Mn was determined by gel chromatography).

EXAMPLE 2

110.7 g of neopentyl glycol carbonate are dissolved in 944 g of tetrahydrofuran in an apparatus equipped and pretreated as described in Example 1. The solution is thermostatically controlled at −10° C. and 5 ml of 1-molar $TASHF_2$ solution (5 mmol of $TASHF_2$) are added. The polymerization is initiated by adding 11.2 g (59.7 mmol) of 2-acryloyloxyethyl trimethylsilyl ether and is terminated after 30 minutes by adding 25 ml of methanolic hydrochloric acid. 110 g of polymer are obtained after the volatile constituents have been removed by evaporation. The $^1$H-NMR spectrum of the polymer (in $CDCl_3$) indicates, in addition to the two singlets for the methyl and methylene protons of the polymer chain, the signals, between 5.8 and 6.5 ppm, of the 3 protons of the vinyl group and a signal, at 4.4 ppm, for the 4 protons of the —$OCH_2CH_2O$—group of the initiator radical. The ratio between the intensities of the signals for the protons of the polymer chain and for the initiator radical gives an $M_n$ value of 1.8 kg/mol for the polymer.

EXAMPLE 3

The procedure described in Example 1 is followed, except that the polymerization is initiated with 0.3 g (2 mmol) of isobutyl trimethylsilyl ether. Work-up of the polymerization mixture gives 3.2 g of polymer ($M_n$ value, determined by gel chromatography: 1.2 kg/mol).

EXAMPLE 4

The procedure described in Example 3 is followed. The monomer employed is 3 g of 5-methylidene-1,3-dioxan-2-one. 3.3 g are obtained of a polymer which is at first oily and later solidifies.

EXAMPLE 5

The procedure described in Example 3 is followed. However, the monomer u$ed is 3 g of 5-ethyl-5-lpropen-2-yl- oxymethyl)-1,3-dioxan-2-one. 3.5 g of polymer are obtained in the form of a viscous liquid. The polymer can be crosslinked in a free-radical mechanism by means of azobis-(isobutyronitrile) (1% by weight at 60° C.) to give an insoluble polymer.

EXAMPLE 6

The procedure described in Example 1 is followed; the catalyst used, is, however, 0.2 ml (0.2 mmol) of a 1-molar solution of tris-(dimethylamino)-sulphonium difluorotrimethylsilicate (TASF) in acetonitrile. The polymerization is initiated with 0.3 g (2 mmol) of isobutyl trimethylsilyl ether. Work-up gives 3.2 g of polymer.

EXAMPLE 7

A mixture of 4.5 g of neopentyl glycol carbonate and 0.5 g of bis-(5-ethyl-1,3-dioxan-2-one-5-yl)-methyl carbonate is melted at 120° C., and 0.02 ml (0.02 mmol) of a 1-molar solution of TASHF$_2$ in acetonitrile and 0.02 g (0.13 mmol) of isobutyl trimethylsilyl ether are added. The polymerization mixture solidifies after 3 minutes to give a clear, solid polymer.

EXAMPLE 8

The procedure described in Example 7 is followed, using a monomer mixture composed of 4.5 g of 5-ethyl-5-(propen-2-yloxymethyl)-1,3-dioxan-2-one and 0.5 g of bis-(5-ethyl-1,3-dioxan-2-one-5-yl)-methyl carbonate.

The polymerization mixture solidifies after 5 minutes to give a clear, solid polymer.

EXAMPLE 9

The procedure described in Example 7 is followed; the monomer mixture employed is composed of 2.25 g of neopentyl glycol carbonate, 2.25 g of 5-ethyl-5-(propen-2- yloxymethyl)-1,3-dioxan-2-one and 0.5 g of bis-(5-ethyl-1,3dioxan-2-one-5-yl)-methyl carbonate. The polymerization is carried out at 94° to 98° C. A clear, solid polymer is obtained after a polymerization time of 32 minutes.

EXAMPLE 10

10 g of neopentyl glycol carbonate are melted at a bath temperature of 110° C. 0.47 g (2.5 mmol) of 2-acryloyloxyethyl trimethylsilyl ether and 0.1 ml of a 1-molar solution of TASHF$_2$ (0.1 mmol) are added to the melt with stirring. The polymerization mixture is stirred for 10 minutes. After dilution with 30 ml of anhydrous toluene, the polymerization is terminated by adding 1 ml of toluene saturated with anhydrous HCl gas. Removing the volatile constituents by distillation gives 8.4 g of polymer ($M_n$ value, determined by gel chromatography: 3.4 kg/mol). The $^1$H-NMR spectrum of the polymer conforms to that of the polymer obtained in Example 2. An average degree of polymerization of 25 can be calculated from the ratio of the corresponding signals.

What is claimed is:

1. A process for the preparation of an aliphatic polycarbonate comprising polymerizing a cyclic, aliphatic carbonate in the presence of an initiator and a catalyst, wherein the initiator is an alkoxy silane of the formula

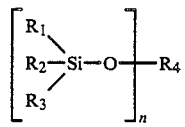

in which
$R_1$, $R_2$ and $R_3$ independently of one another are $C_1$–$C_4$-alkyl,
n is an integer from 1 to 6 and
$R_4$ is an n-valent aliphatic hydrocarbon radical or an n-valent substituted aliphatic hydrocarbon radical, and wherein the catalyst is a nucleophilic catalyst which is known from group transfer polymerization.

2. The process of claim 1, wherein the initiator is an alkoxysilane of the formula (I) in which
$R_4$ is an n-valent aliphatic hydrocarbon radical or a substituted n-valent derived from a monohydric or a polyhydric alcohol.

3. The process of claim 1, wherein the initiator is an alkoxy silane of the formula (I) in which $R_4$ is an n-valent hydrocarbon radical which is substituted by a substituent selected from the group consisting of alkoxy, alkenoxy, (meth)acryloyloxy and (meth)acryloylamino.

4. The process of claim 1, wherein the initiator is an alkoxysilane of the formula (I) in which $R_4$ is 2-(meth)acryloyl-oxyethyl, 3-(meth)acryloyloxypropyl, 2-(meth)acryloylaminoethyl, 2-methoxyethyl, 2-hexyloxyethyl, 3-ethoxypropyl, 3-allyloxyethyl, 3-methoxy-1,2-propylene or 2,2-bisethoxy-1,3-propylene.

5. The process of claim 1, wherein the nucleophilic catalyst known from group transfer polymerization is tris-(dimethylamino)-sulphonium difluorotrimethylsilicate (TASF), tetrabutylammonium fluoride (TBAF), tris-(dimethylamino)-sulphonium hydrogenfluoride (TASHF$_2$), benzyltrimethylammonium fluoride or benzyltrimethylammonium hydrogenfluoride or a mixture of two or more of these compounds.

6. The process of claim 1, wherein the alkoxy silane amount is 0.001 to 20% by weight relative to the weight of the monomer.

7. The process of claim 1 wherein the molar ratio of initiator and the catalyst is between 500:1 and 0.1:1.

8. The process of claim 1, wherein the cyclic, aliphatic carbonate is non-crosslinking.

9. The process of claim 8, wherein the cyclic carbonate has 6 ring members.

10. The process of claim 1 wherein the polymerization is carried out in the absence of solvents at temperatures from 70° to 170° C., or in the presence of solvents, at temperatures from −100° to +20° C.

* * * * *